(12) United States Patent
Kawate et al.

(10) Patent No.: US 7,890,553 B2
(45) Date of Patent: Feb. 15, 2011

(54) INFORMATION RECORDING APPARATUS AND INFORMATION RECORDING METHOD

(75) Inventors: Fumitaka Kawate, Kanagawa (JP);
Shigeru Kashiwagi, Tokyo (JP);
Masayoshi Ohno, Tokyo (JP); Hideo Obata, Kanagawa (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/019,402

(22) Filed: Jan. 24, 2008

(65) Prior Publication Data
US 2008/0222222 A1   Sep. 11, 2008

(30) Foreign Application Priority Data
Mar. 9, 2007   (JP)   ............... 2007-060421

(51) Int. Cl.
*G06F 12/00* (2006.01)
(52) U.S. Cl. ............... 707/821; 396/229; 700/94; 715/500.1; 386/1; 711/117; 711/171
(58) Field of Classification Search ............... 396/229, 396/1; 700/94; 75/500.1; 707/821; 711/117, 711/171
See application file for complete search history.

(56) References Cited

U.S. PATENT DOCUMENTS

| | | | | |
|---|---|---|---|---|
| 5,437,028 A * | 7/1995 | Iijima | ............... | 1/1 |
| 5,608,902 A * | 3/1997 | Iijima | ............... | 707/697 |
| 7,613,746 B2 * | 11/2009 | Rudd et al. | ............... | 1/1 |
| 2002/0122075 A1 * | 9/2002 | Karasawa et al. | ............... | 345/846 |
| 2003/0122966 A1 * | 7/2003 | Markman et al. | ............... | 348/563 |
| 2004/0263644 A1 * | 12/2004 | Ebi | ............... | 348/231.2 |
| 2005/0160256 A1 * | 7/2005 | Huang et al. | ............... | 713/2 |
| 2005/0192982 A1 * | 9/2005 | Takahashi | ............... | 707/100 |
| 2005/0238314 A1 * | 10/2005 | Asayama et al. | ............... | 386/1 |
| 2005/0244147 A1 * | 11/2005 | Yamagata et al. | ............... | 386/125 |
| 2006/0045488 A1 * | 3/2006 | Maeda | ............... | 386/95 |
| 2007/0088674 A1 * | 4/2007 | Kawate et al. | ............... | 707/2 |
| 2008/0177775 A1 * | 7/2008 | Kawate et al. | ............... | 707/102 |

FOREIGN PATENT DOCUMENTS

| | | |
|---|---|---|
| JP | 11-261943 | 9/1999 |
| JP | 2002-49512 | 2/2002 |
| JP | 2005-339622 | 12/2005 |
| JP | 2006-66014 | 3/2006 |
| JP | 2006-352770 | 12/2006 |

* cited by examiner

*Primary Examiner*—Cheyne D Ly
(74) *Attorney, Agent, or Firm*—Oblon, Spivak, McClelland, Maier & Neustadt, L.L.P.

(57) ABSTRACT

An information recording apparatus recording contents on a recording medium and managing the contents by using a content management file includes a control unit that checks a recording state of the recording medium loaded in the information recording apparatus to determine how to set up the content management file to be recorded on the recording medium and recording means for recording the content management file on the recording medium. The control unit determines the file setup of the content management file on the basis of the recording capacity of an area where the contents can be recorded on the recording medium. The recording means records the content management file in accordance with the file setup on the recording medium.

9 Claims, 12 Drawing Sheets

FIG. 5

| CAPACITY OF RECORDING MEDIUM | INITIAL SIZE OF CONTENT MANAGEMENT FILE |
|---|---|
| 128 MB | 2 MB |
| 512 MB | 4.5 MB |
| 2 GB | 10.5 MB |
| 8 GB | 54 MB |
| 32 GB | 313 MB | ness
INFORMATION RECORDING APPARATUS AND INFORMATION RECORDING METHOD

CROSS REFERENCES TO RELATED APPLICATIONS

The present invention contains subject matter related to Japanese Patent Application JP 2007-060421 filed in the Japanese Patent Office on Mar. 9, 2007, the entire contents of which are incorporated herein by reference.

BACKGROUND OF THE INVENTION

1. Field of the Invention

The present invention relates to information recording apparatuses and information recording methods. More particularly, the present invention relates to an information recording apparatus, such as a video camera or a still camera, which records not only captured image, such as moving images or still images, but also management information corresponding to the captured images and to an information recording method in the information recording apparatus.

2. Description of the Related Art

Some apparatuses, such as video cameras or still cameras, capturing and recording moving images or still images are configured to record management information corresponding to the captured image data in management information files. For example, information concerning the dates and times when the images are captured, thumbnail images, and text information indicating features of the captured images are recorded in the management information files. Such recording configuration of the management information in related art is disclosed in, for example, Japanese Unexamined Patent Application Publication No. 2006-66014.

A file in which the management information is recorded is called a content management file or an Audio Video (AV) index file. The file in which the management information is recorded is hereinafter referred to as the "content management file", entity data resulting from capturing of a moving image or still image is hereinafter referred to as a "content", and a file in which contents are recorded is hereinafter referred to as a "content file".

Information recording apparatuses, such as video cameras or still cameras, which record contents, such as moving images or still images, on information recording media, such as hard disks or flash memories, set in advance the areas where the content management files are recorded before starting the recording of the contents, for example, in initialization of the recording media. The content management file set in each information recording apparatus is repeatedly accessed each time each content file is accessed. An occurrence of fragmentation in which the files included in the content management file are scattered on the recording media undesirably reduces the access rate. In order to avoid such a situation, the areas where the files in the content management file are recorded are collectively allocated to a certain section on the recording medium in the initialization of the recording medium.

Information recording apparatuses usually allocate predetermined sizes to the areas where the content management files are recorded and record temporary information, such as all zero, in the allocated areas.

It is sufficient for one content management file to have the maximum size in which the management information corresponding to the maximum number of contents recordable on the recording medium can be recorded. If the content management file becomes full when a new content is to be recorded and no more management information can be recorded, the size of the content management file is too small.

Accordingly, in the initialization of the recording medium, the area in which the management information corresponding to the maximum number of contents estimated on the basis of the capacity of the recording medium can be recorded is allocated to the content management file. If the recording medium is built in the information recording apparatus and it is not necessary for a user to replace the recording medium with another one, it is possible to set an appropriate size of the content management file when the apparatus is designed.

Since the recording medium is not replaced with another one in the case of the built-in recording medium, it is sufficient to set one size to the content management file. In addition, since the built-in recording medium has a higher capacity, it is not necessary to expand the content management file, that is, to vary (increase) the size of the content management file later if the content management file having the estimated maximum size is created in the initialization of the recording medium.

In contrast, when recording media removable from the information recording apparatuses by users are used, the recording media of different types have various capacities. Accordingly, the appropriate size of the content management file is varied in accordance with the capacity of the recording medium that is used.

There are cases in which image files have already been recorded on a recording medium but the content management file including the management information corresponding to the recorded image files is not recorded. In other words, some image recording apparatuses in the related art do not record the content management files. When a recording medium on which images are recorded by using such an image recording apparatus in the related art is loaded in an image pickup apparatus that records the content management file, there are cases where the user wants to additionally create the content management file with the image files being left on the recording medium. In such cases, it is not possible to calculate the appropriate size of the content management file by a method similar to that for the built-in recording medium.

There are cases where the free space corresponding to the calculated size of the content management file is not left on the removable media. In addition, there are cases where content files can be additionally recorded on a removable medium after some content files are deleted even if the removable medium initially has the content files recorded thereon and has smaller free space. In such cases, no more content can possibly be added because the space of the content management file becomes short. If such an event occurs, it is necessary to increase the size of the content management file.

SUMMARY OF THE INVENTION

It is desirable to provide an information recording apparatus and an information recording method capable of determining the size of the content management file most appropriate for various states of a recording medium, such as the capacity of the recording medium and the amount of data recorded on the recording medium, to create the content management file having the determined size.

According to an embodiment of the present invention, an information recording apparatus recording contents on a recording medium and managing the contents by using a content management file includes a control unit that checks a recording state of the recording medium loaded in the information recording apparatus to determine how to set up the content management file to be recorded on the recording medium and recording means for recording the content management file on the recording medium. The control unit determines the file setup of the content management file on the basis of the recording capacity of an area where the contents can be recorded on the recording medium. The recording means records the content management file in accordance with the file setup on the recording medium.

The file setup preferably at least includes the size of the content management file.

The recording state preferably at least includes the presence of the content management file and the recording capacity of the recording medium.

The information recording apparatus may further include managing means for managing the file setup in accordance with the recording capacity of the recording medium. The control unit may determine the file setup of the content management file on the basis of the file setup managed by the managing means.

According to another embodiment of the present invention, an information recording apparatus recording contents on a recording medium and managing the contents by using a content management file includes updating means for updating the content management file recorded on the recording medium and a control unit that checks a recording state of the recording medium loaded in the information recording apparatus to determine how to set up the content management file to be recorded on the recording medium. The control unit determines the file setup of the updated content management file on the basis of the recording capacity of an area where the contents can be recorded on the recording medium and the file setup of the content management file. The updating means updates the content management file recorded on the recording medium in accordance with the file setup of the updated content management file.

The file setup preferably at least includes the size of the content management file.

The recording state preferably at least includes the presence of the content management file and the recording capacity of the recording medium.

According to another embodiment of the present invention, an information recording method recording contents on a recording medium loaded in an information recording apparatus and managing the contents by using a content management file includes the steps of checking a recording state of the recording medium loaded in the information recording apparatus; determining how to set up the content management file on the basis of the recording capacity of an area where the contents can be recorded on the recording medium; and recording the content management file in accordance with the file setup on the recording medium.

The information recording method may further include the step of determining the file setup of the content management file on the basis of the file setup managed by managing means in the information recording apparatus for managing the file setup in accordance with the recording capacity of the recording medium.

Further features and advantages of the present invention will become apparent from the following description of exemplary embodiments with reference to the attached drawings.

According to the embodiments of the present invention, the size or additional size of the content management file is determined in consideration of the capacity or free space on the recording medium, such as a removable medium, so that the content management files having appropriate sizes can be set for the recording media having different capacities. In addition, since the size of the content management file can be varied (increased), it is possible to update the size of the content management file to a more appropriate size even when the size of the content management file set in the initialization of the recording medium is too small or the free space on the recording medium is increased because of deletion of data.

BRIEF DESCRIPTION OF THE DRAWINGS

FIG. 5 illustrates an example of a management table used for managing the correspondence between the capacities of recording media and the sizes of content management files;

DESCRIPTION OF THE PREFERRED EMBODIMENTS

An information recording apparatus and information recording methods according to exemplary embodiments of the present invention will herein be described with reference to the attached drawings.

Configuration of Information Recording Apparatus

Figure 1:
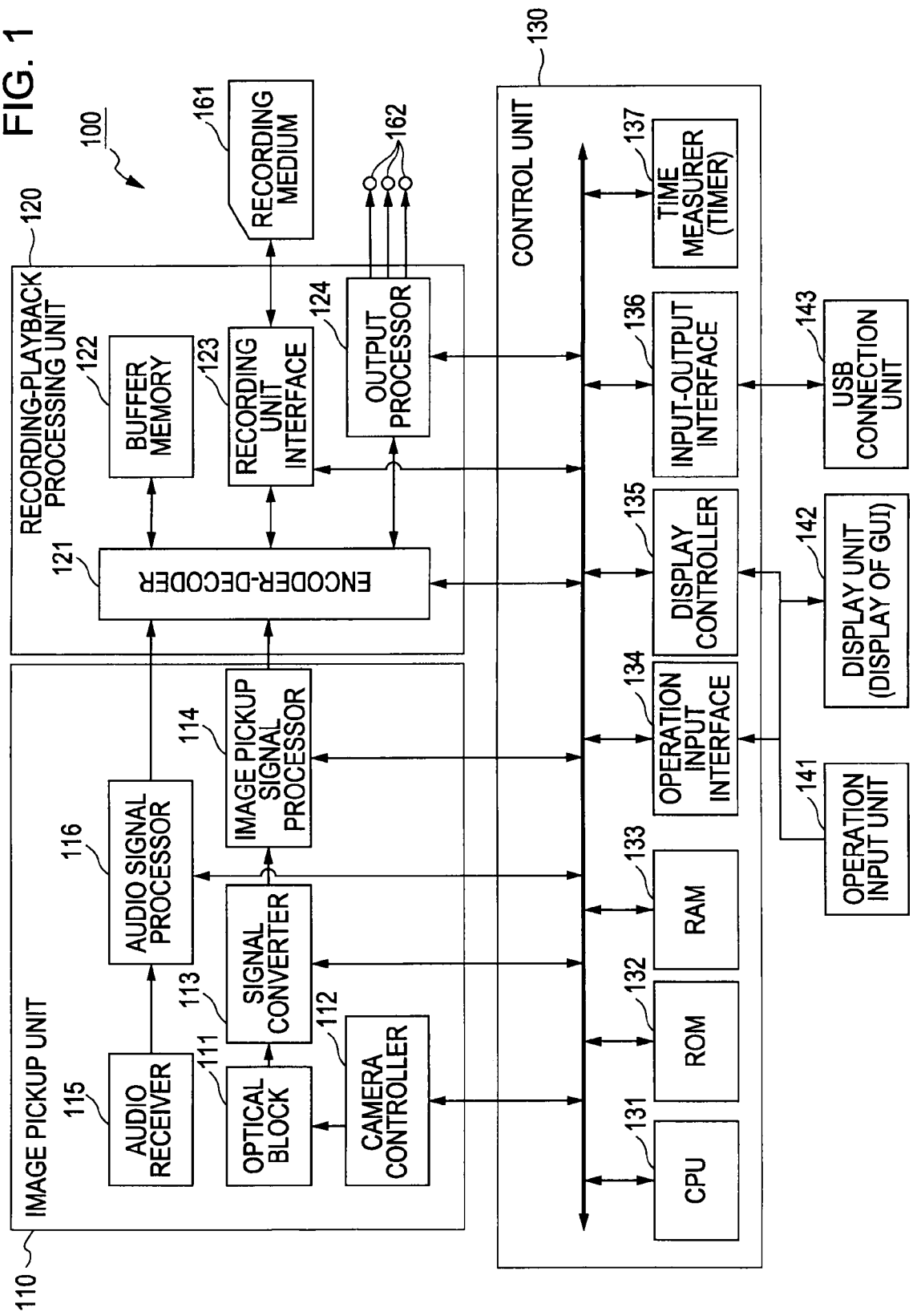
FIG. 1 is a block diagram showing an example of the configuration of an information recording apparatus according to an embodiment of the present invention.

FIG. 1 is a block diagram showing an example of the configuration of a digital video camera 100 to which an information recording apparatus according to an embodiment of the present invention is applicable. The digital video camera 100 includes an image pickup unit 110, a recording-playback processing unit 120, and a control unit 130.

The image pickup unit 110 includes an optical block 111, a camera controller 112, a signal converter 113, an image pickup signal processor 114, an audio receiver 115, and an audio signal processor 116. The optical block 111 includes a lens group through which an image of a subject is captured, an aperture control mechanism, a focus adjustment mechanism, a zooming mechanism, a shutter mechanism, a flash mechanism, and a camera-shaking correction mechanism. The camera controller 112 generates a control signal to be supplied to the optical block 111 in response to a control signal supplied from the control unit 130. The camera controller 112 supplies the generated control signal to the optical block 111 to perform, for example, zoom control, shutter control, and exposure control.

The signal converter 113 is an image pickup device, such as a charge coupled device (CCD). An image of the subject is formed on the image forming surface of the signal converter 113 through the optical block 111. The signal converter 113 converts the image of subject, formed on the image formation surface thereof, into an image pickup signal in response to an image capturing timing signal supplied from the control unit 130 in response to a user's operation of the shutter and supplies the image pickup signal to the image pickup signal processor 114.

The image pickup signal processor 114 performs, for example, gamma correction and automatic gain control (AGC) to the image pickup signal in response to a control signal supplied from the control unit 130 and converts the image pickup signal into a digital image signal. The audio receiver 115 collects a sound around the subject at photographing. The audio receiver 115 supplies the audio signal to the audio signal processor 116. The audio signal processor 116 performs, for example, correction and the automatic gain control to the audio signal in response to a control signal supplied from the control unit 130 and converts the audio signal into a digital audio signal.

The recording-playback processing unit 120 includes an encoder-decoder 121, a recording unit interface 123, an output processor 124, and a buffer memory 122.

The encoder-decoder 121 has an encoding function of encoding and multiplexing the image signal and audio signal supplied from the image pickup unit 110 and additional recording information to convert them into compressed data. The encoder-decoder 121 also has a decoding function of separating the compressed data into the image signal, the audio signal, and the additional recording information and decoding them. The encoder-decoder 121 further performs, for example, automatic white balance control, exposure control, magnification control in accordance with the digital zoom ratio to the image signal supplied from the image pickup signal processor 114 in response to a control signal supplied from the control unit 130.

The recording unit interface 123 receives the compressed data from the encoder-decoder 121 and records the compressed data in a recording medium 161. The recording medium 161 is, for example, a flash memory. The recording medium 161 may be, for example, a hard disk or a digital versatile disk (DVD).

The recording unit interface 123 reads out the compressed data from the recording medium 161 and supplies the readout compressed data to the encoder-decoder 121. The output processor 124 supplies the compressed data supplied from the encoder-decoder 121 to the control unit 130 and output terminals 162 under the control of the control unit 130. The buffer memory 122 is, for example, a synchronous dynamic random access memory (SDRAM). The buffer memory 122 is used as a working memory for the encoding or decoding.

The control unit 130 includes a central processing unit (CPU) 131, a read only memory (ROM) 132, a random access memory (RAM) 133, an operation input interface 134 used for connection to an operation input unit 141, a display controller 135 used for connection to a display unit 142, an input-output interface 136 used for data input-output through a USB connection unit 143, and a time measurer 137 that records the shooting time. The components in the control unit 130 are connected to each other via a system bus.

The CPU 131 controls the processing in the control unit 130 and uses the RAM 133 as the working area. The ROM 132 stores programs used for controlling the image pickup unit 110 and programs used for controlling recording and playback of the image signal and the audio signal. The CPU 131 reads out the programs to perform a variety of processing in accordance with the programs.

The operation input unit 141 connected to the operation input interface 134 is provided with multiple keys including a mode switching key used for switching between a shooting mode and another mode, such as a playback mode, a zoom control key, an exposure control key, a shutter key, a moving image key, and a key used for controlling the display in the display unit 142. The operation input interface 134 supplies an operation signal supplied from the operation input unit 141 to the CPU 131. The CPU 131 determines which key is operated in the operation input unit 141 to perform control processing in accordance with the determination result.

The display unit 142 connected to the display controller 135 is, for example, a liquid crystal display. The display unit 142 displays the image signal supplied from the image pickup unit 110 or an image signal read out from the recording medium 161 under the control of the CPU 131.

The input-output interface 136 supplies, for example, the compressed data from the encoder-decoder 121 to an external device or an external memory connected to the USB connection unit 143. The input-output interface 136 receives data from the external device or external memory connected to the USB connection unit 143 and supplies the received data to the encoder-decoder 121. The time measurer 137 generates time information representing a year, month, date, time, minute, and second.

The configuration of content files in which contents are stored and a content management file and the correspondence between the content files and the content management file will now be described with reference to FIG. 2. The contents are recorded on the recording media in the information recording apparatus according to the embodiment of the present invention. That is, the contents are entity data captured by a video camera or a still camera. The content management file has management information corresponding to the recorded content files recorded therein.

Figure 2:
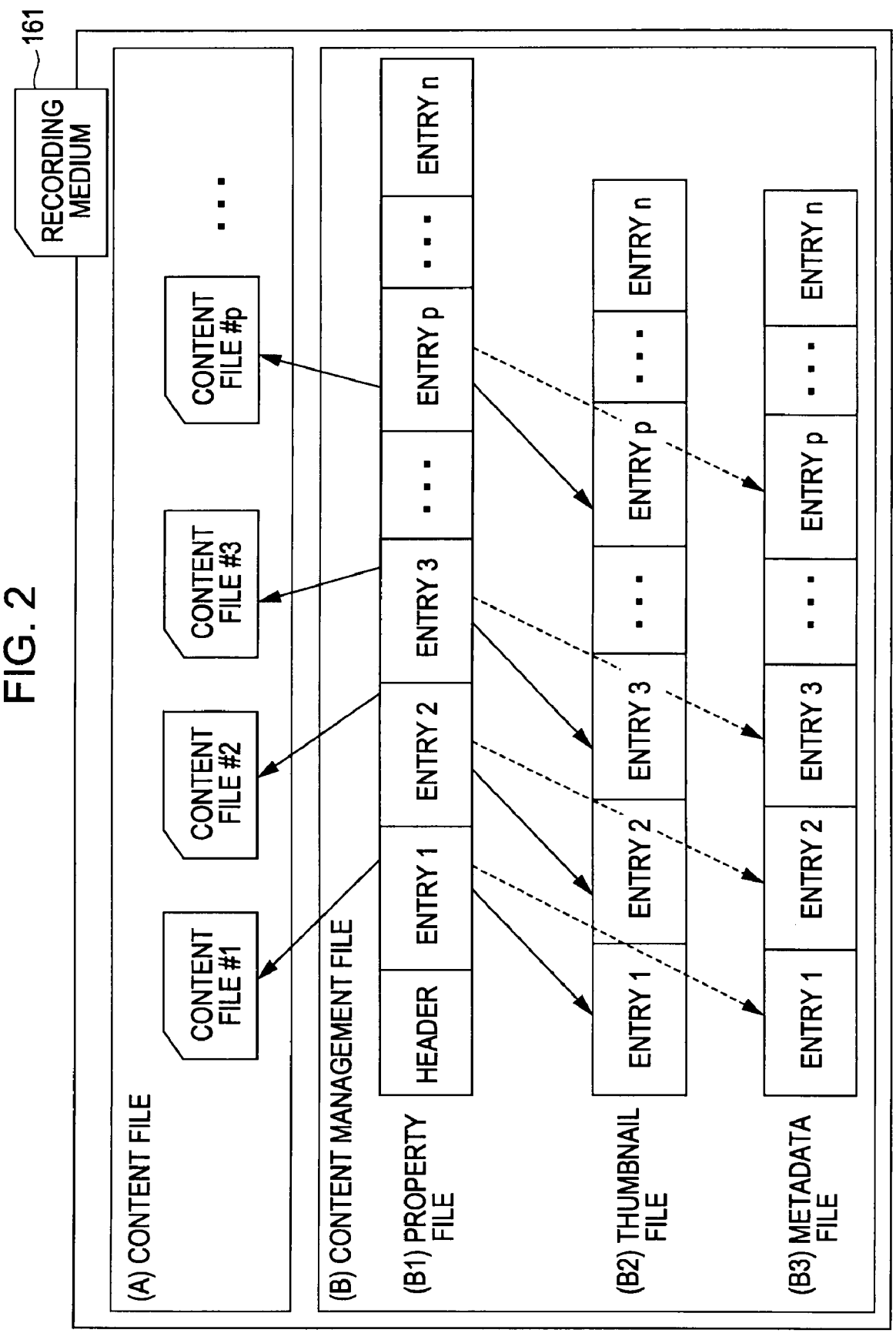
FIG. 2 illustrates an example of the structure of data recorded on a recording medium in the information recording apparatus according to the embodiment of the present invention.

FIG. 2 illustrates an example of the structure of data recorded on the recording medium 161 shown in FIG. 1, which is a flash memory. The data recorded on the recording medium 161 includes:

(1) the content files in which contents corresponding to captured data are stored, and
(2) the content management file in which management information corresponding to the content files is recorded.

One content file is generated for every piece of captured data. For example, in the case of video data, one content file is generated for every piece of video data from the start to the end of capturing. In the case of a still image, one content file is generated for every still image that is captured. A content file #1, a content file #2, a content file #3, . . . , a content file #p are created for contents that are recorded.

The content management file is prepared in advance before starting the recording of contents, such as moving images or still images, for example, in initialization of the recording medium. Specifically, the area where the content management file is recorded is set in the initialization of the recording medium. As described above, the files in the content management file, which are repeatedly accessed each time each content file is accessed, are collectively recorded in one section to avoid a reduction in the access rate.

Dummy data of, for example, all zero is recorded in the areas where the content management information is to be recorded in the content management file, which are set before starting the recording of the contents. The content management information corresponding to the content file that is subsequently created is overwritten on the dummy data.

As shown in FIG. 2, the AV index file, which is the content management file, includes:

(B1) property file,
(B2) thumbnail file, and
(B3) metadata file.

Entries in which the content management information corresponding to the content files is recorded are set in the content management file. In principle, the content management information corresponding to one content file is recorded in one entry. However, the content management information corresponding to one content file may be recorded in two or more entries.

The property file includes a header in which basic information, such as the data length, about the content management file is stored. The property file includes, in addition to the header, main management information corresponding to each content file, such as a content identifier and the date and time when the content is captured, index information about entries corresponding to the thumbnail file, and index information about entries corresponding to the metadata file. In access to the content management file, first, the entry corresponding to the content file is acquired from the property file to read out the main management information. Then, the indexes of the entries corresponding to the thumbnail file and the metadata file are acquired to read out the entries corresponding to the thumbnail file and the metadata file in accordance with the acquired indexes.

In the thumbnail file, thumbnails of typical images of the content files are stored in the entries. The metadata file includes text information corresponding to the content files, for example, positional information indicating where the contents are captured.

The areas for the property file, the thumbnail file, and the metadata file in the content management file are allocated before starting the recording of the contents, for example, in the initialization of the recording medium, as described above. The dummy data is recorded in at least part of the areas in which the content management information is to be recorded in the content management file, which are set before starting the recording of the contents. The content management information corresponding to the content file that is subsequently created is overwritten on the dummy data.

Accordingly, in the initialization of the recording medium, the area in which the management information corresponding to the maximum number of contents estimated on the basis of the capacity of the recording medium can be recorded is allocated to the content management file.

As described above, when it is not necessary to replace the recording medium with another one, for example, when the hard disk built in the video camera is used as the recording medium, it is sufficient to set in advance one size appropriate for the capacity of the hard disk for the content management file. The area for the content management file can be allocated in accordance with the set size.

However, when a removable medium, such as a flash memory, is used as the recording medium, the recording medium loaded by the user in the information recording apparatus (for example, video camera) has the following features:

(1) the recording media of different types have various capacities
(2) there area cases where image files have already been recorded on the recording medium and where no image file has been recorded thereon
(3) there are cases where the content management file has already been recorded on the recording medium and where the content management file has not been recorded thereon Since the recording media having various conditions are possibly used, it is not possible to set the areas for the content management files in the same manner when the recording medium having various conditions are loaded. According to the embodiments of the present invention, it is possible to create an appropriate content management file when such a recording medium is used. Specifically, it is possible to determine the size of the content management file most appropriate for various states of a recording medium, such as the capacity of the recording medium and the amount of data recorded on the recording medium, to create the content management file having the determined size. Processes of creating the content management file in the information recording apparatus according to embodiments of the present invention will now be described. The following multiple processes will be sequentially exemplified.

Figure 3:
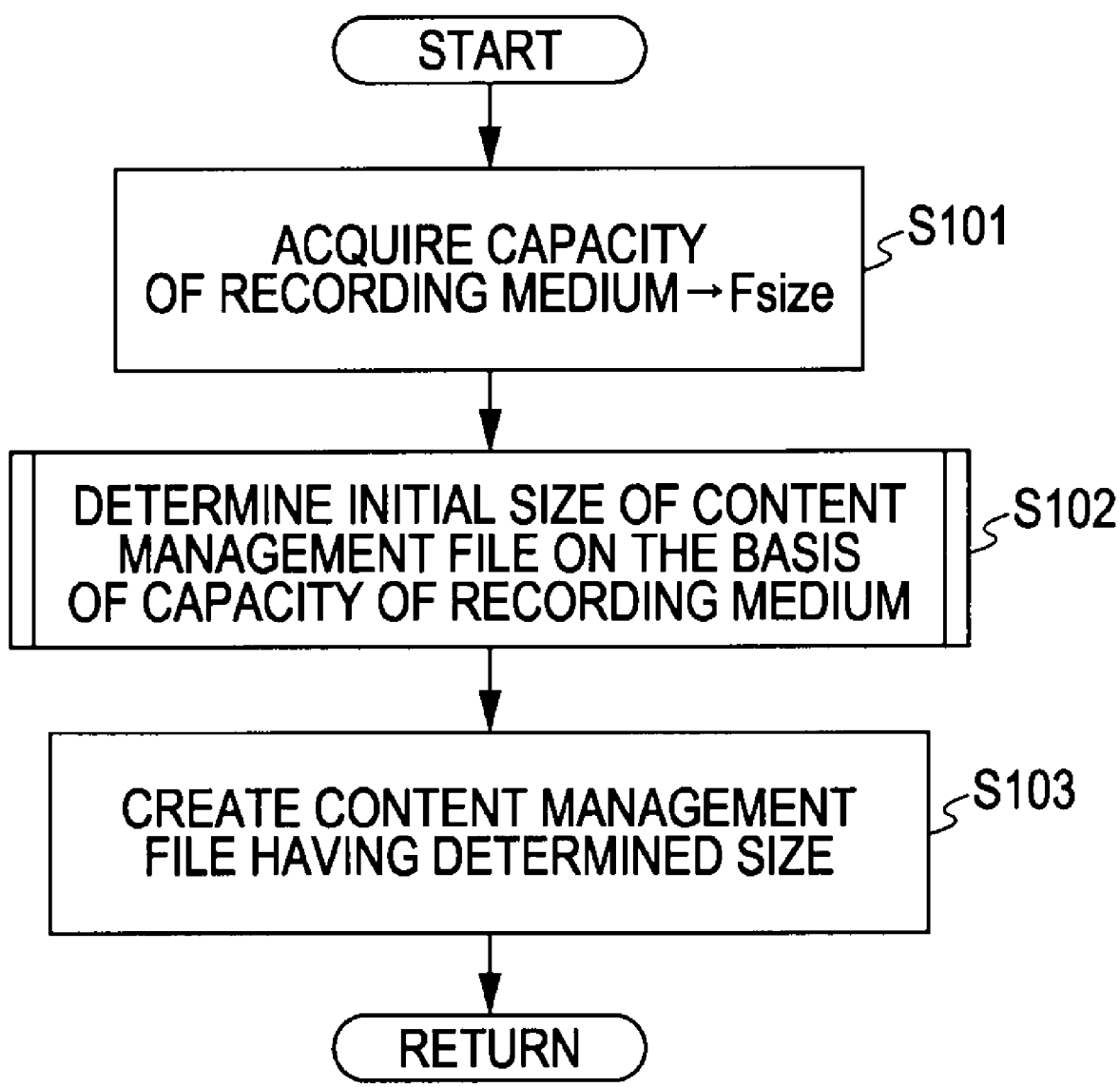
FIG. 3 is a flowchart showing an example of a process of determining the size of a content management file to create the content management file, performed in the information recording apparatus according to the embodiment of the present invention.

1. Setup of the content management file in the initialization of the recording medium
2. Setup of the content management file in consideration of the free space on the recording medium
3. Setup of the content management file on the recording medium on which the content files are recorded
4. Increase in the size of the content management file
5. Increase in the size of the content management file in consideration of the free space on the recording medium 1. Setup of the Content Management File in the Initialization of the Recording Medium FIG. 3 is a flowchart showing an example of a process of creating the content management file in the initialization of the recording medium. The processes shown in FIG. 3 and the subsequent figures are performed, for example, under the control of the control unit 130 in the information recording apparatus shown in FIG. 1. In the processes shown in FIG. 3 and the subsequent figures, the capacity or recording state of the recording medium 161 (for example, flash memory) is checked to create the content management file and to record the content management file on the recording medium.

Referring to FIG. 3, in Step S101, the control unit in the information recording apparatus acquires the capacity of the recording medium loaded in the information recording apparatus. The control unit acquires the entire capacity of the recording medium. The acquired capacity of the recording medium is denoted by [Fsize].

In Step S102, the control unit determines the initial size of the content management file on the basis of the capacity [Fsize] of the recording medium. The determination of the initial size of the content management file will be described in detail below with reference to FIG. 4. In Step S103, the control unit creates the content management file having the initial size determined in Step S102 and records the content management file on the recording medium. The dummy data is embedded in at least part of the content management file to be recorded on the recording medium.

Figure 4:
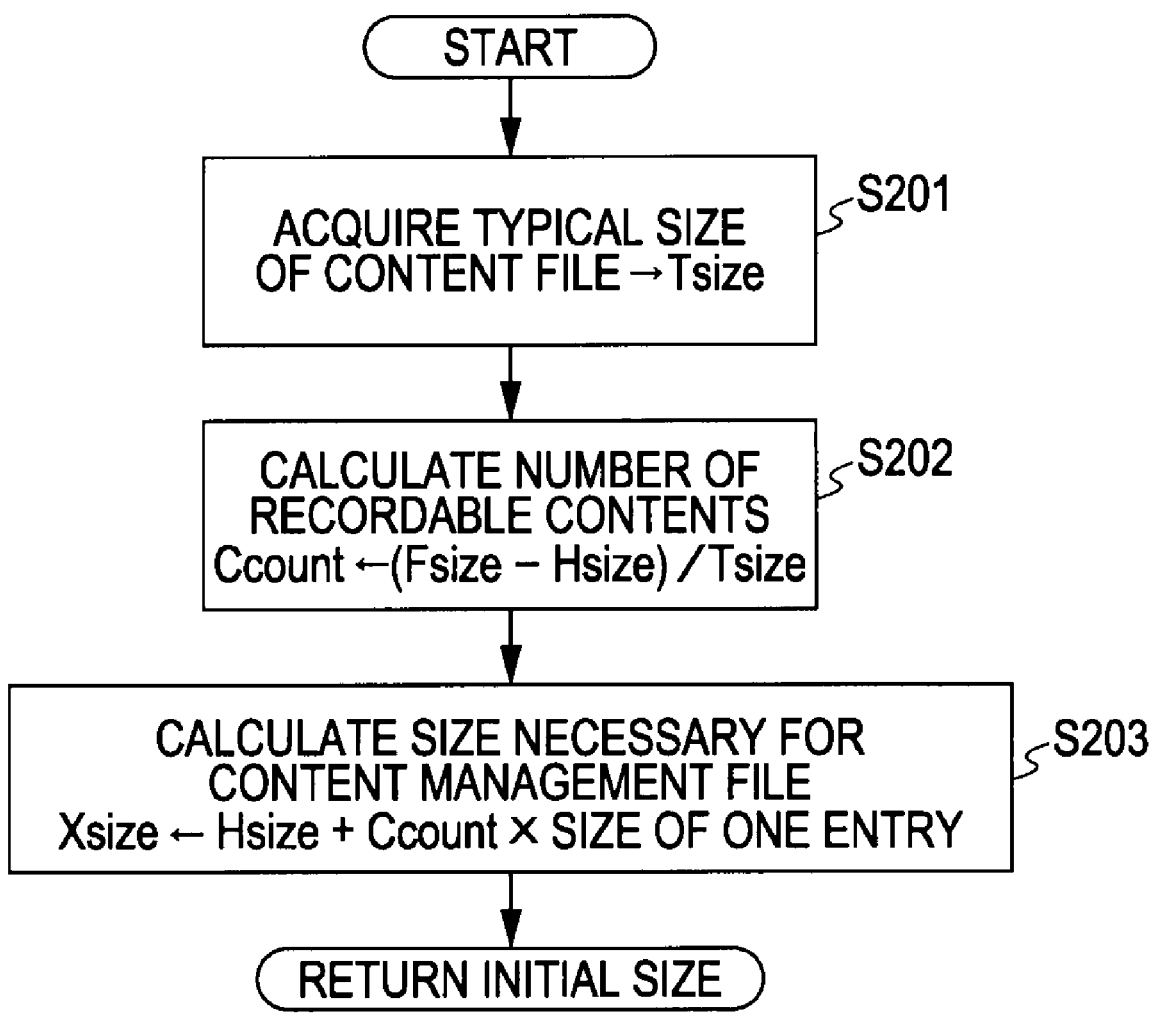
FIG. 4 is a flowchart showing in detail an example of the process of determining the size of the content management file, performed in the information recording apparatus according to the embodiment of the present invention.

FIG. 4 is a flowchart showing in detail an example of the process of determining the initial size of the content management file on the basis of the capacity [Fsize] of the recording medium in Step S102. In Step S201, the control unit acquires the typical size of the content file from the memory. The typical size is denoted by [Tsize].

The typical size [Tsize] indicates the typical size of one content file. For example, in the case of a still camera capturing still images, the typical size [Tsize] indicates the typical size of one content file in which one still image is stored. In the case of a video camera, the typical size [Tsize] indicates the typical size of one content file in which one video content is stored. Such a typical size is set in advance and is recorded in the memory of the information recording apparatus.

The typical size of one content file can be determined in the following manners.

(a) When still images are recorded as contents in the information recording apparatus (a1) The file size of data in the highest image quality at the highest resolution at which the still images can be recorded (a2) The file size of data in the standard image quality at the highest resolution at which the still images can be recorded The typical size is set to (a1) or (a2).

(b) When moving images are recorded as contents in the information recording apparatus (b1) The file size of data captured in the highest image quality for the recording time statically calculated for one content (b2) The file size of data captured in the highest image quality for the shortest time during which one content can be recorded The typical size is set to (b1) or (b2).

(c) When both still images and moving images are recorded as contents in the information recording apparatus The typical file sizes (the average file sizes) of the still images and the moving images are calculated, and the frequencies at which the still images and the moving images are captured are statically calculated. The file size calculated by weighted average is determined to be the typical size.

As described above, the typical size is determined in advance depending on the kind of contents recorded in the information recording apparatus and the determined typical file size is stored in the memory as registration information. The control unit acquires the value stored in the memory. An algorithm for calculating the typical file size may be set in a program and the algorithm may be sequentially executed to determine the typical size.

Referring back to FIG. 4, in Step S202, the control unit calculates the number [Ccount] of contents recordable on the recording medium. The number [Ccount] of contents recordable on the recording medium is calculated according to the following equation:

[Ccount]=[Fsize−Hsize]/Tsize where "Fsize" denotes the size of the recording medium, "Hsize" denotes the size of the header in the content management file (the size of the header in the property file in FIG. 2 and a fixed value), and "Tsize" denotes the typical size of the content file.

In Step S203, the control unit calculates the size [Xsize] necessary for the content management file. The size [Xsize] necessary for the content management file is calculated according to the following equation:

Xsize=Hsize+Ccount×(size of one entry)

where "Hsize" denotes the size of the header in the content management file (the size of the header in the property file in FIG. 2 and a fixed value), "Ccount" denotes the number of contents recordable on the recording medium, and the "size of one entry" denotes the size of the entry set for one content file set in the content management file (the total of the sizes of one entry in the property file, one entry in the thumbnail file, and one entry in the metadata file shown in FIG. 2 and a predetermined fixed value).

The calculation of the size [Xsize] of the content management file in the above manner can create the content management file in which the entries of the number appropriate for the number of content files recordable on the recording medium are set to record the content management file on the recording medium.

The capacity of a recording medium is normally set to a predetermined size, for example, 8 GB (gigabytes) or 32 GB. Accordingly, a management table (correspondence table) shown in FIG. 5 may be recorded in advance in the memory (for example, the ROM 132 in FIG. 1) and the size of the content management file corresponding to the capacity of the recording medium may be acquired from the management table in the determination of the initial size of the content management file. The management table is used for managing the correspondence between the capacities of recording media and the sizes of content management files. In this case, the initial size of the content management file corresponding to the capacity of the recording medium is acquired from the management table to determine the initial size of the content management file in Step S102 in FIG. 3.

Figure 6:
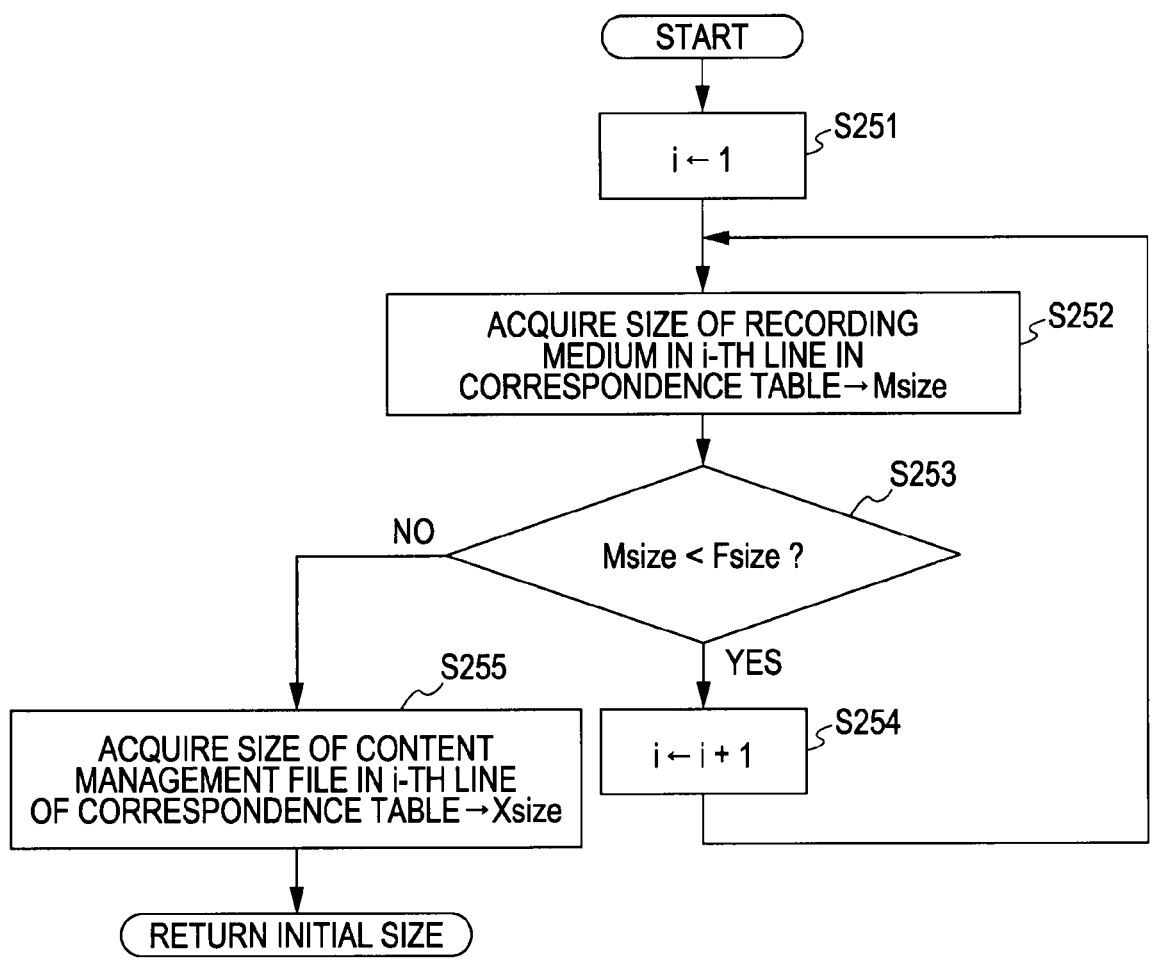
FIG. 6 is a flowchart showing an example of a process of determining the initial size of the content management file from information in the management table.

FIG. 6 is a flowchart showing an example of a process of determining the initial size of the content management file from information in the management table. In Step S251, the control unit initializes "i". In Step S252, the control unit acquires the size [Msize] of the recording medium in the i-th line in the management table in FIG. 5. In Step S253, the control unit compares the size [Fsize] of the recording medium acquired in Step S102 with the size [Msize] of the recording medium acquired from the correspondence table. If [Fsize] is larger than [Msize], then in Step S254, the control unit increments the "i" by one. Then, the process goes back to Step S252. If [Fsize] is smaller than or equal to [Msize] in Step S253, then in Step S255, the control unit acquires the initial size of the content management file in the i-th line of the correspondence table to set the acquired initial size as [Xsize] and creates the content management file having the initial size [Xsize].

Figure 7:
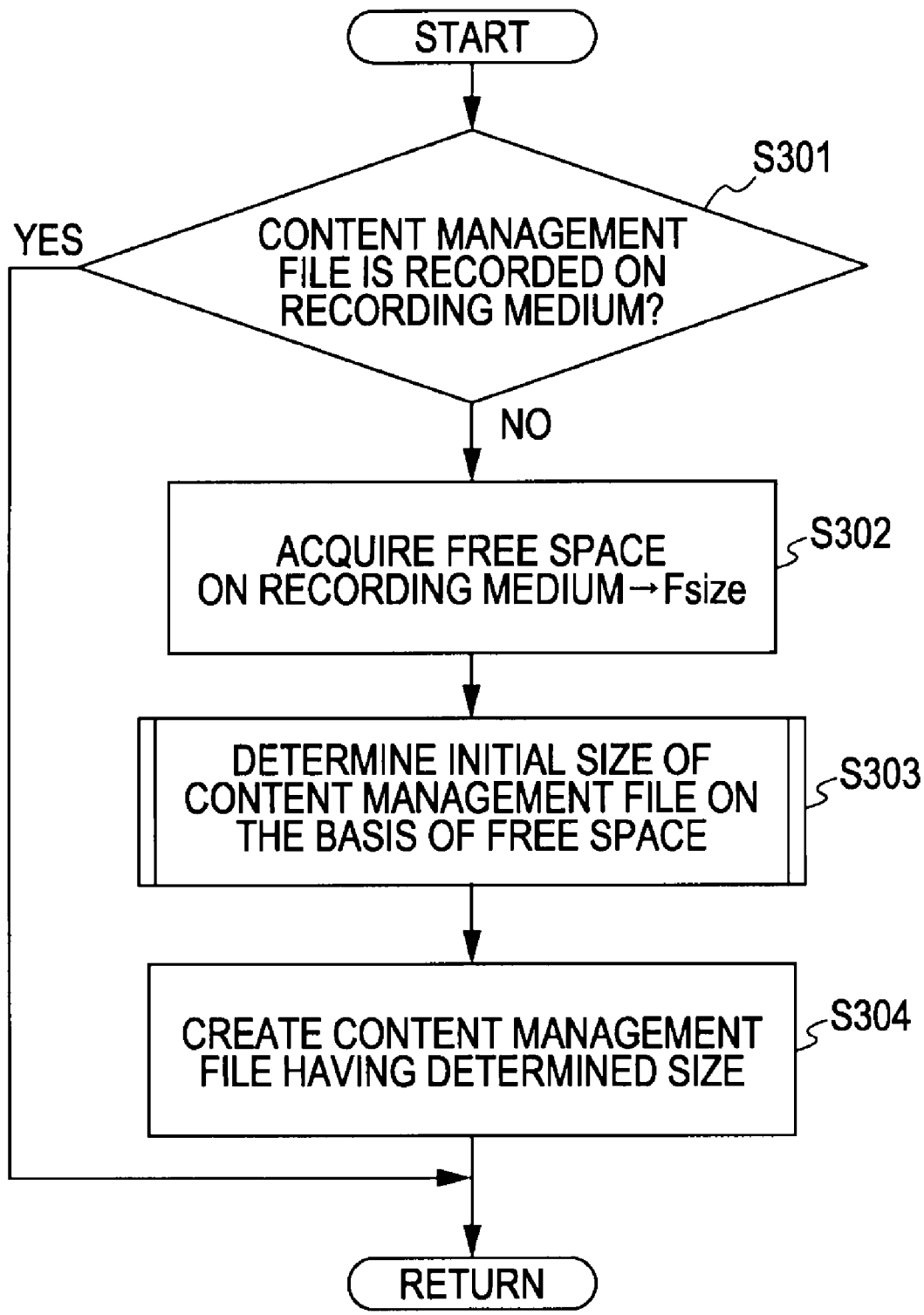
FIG. 7 is a flowchart showing another example of the process of determining the size of the content management file to create the content management file, performed in the information recording apparatus according to the embodiment of the present invention.

2. Setup of the Content Management File in Consideration of the Free Space on the Recording Medium If the recording medium has already been initialized and some data is recorded on the recording medium, it is not desired to perform the initialization because the initialization of the recording medium deletes the recorded data. FIG. 7 is a flowchart showing an example of a process of determining the size of the content management file in consideration of the free space on the recording medium, creating the content management file having the determined size, and recording the content management file on the recording medium.

In Step S301, the control unit determines whether the content management file is recorded on the recording medium loaded in the information recording apparatus. If the control unit determines that the content management file is recorded on the recording medium, the process terminates because there is no need to record the content management file on the recording medium. If the control unit determines that the content management file is not recorded on the recording medium, the process goes to Step S302.

In Step S302, the control unit acquires the free space on the recording medium loaded in the information recording apparatus. In this case, the control unit acquires the size of the area where no data is recorded on the recording medium, excluding the area where the data has been recorded. The acquired size of the free space on the recording medium is denoted by [Fsize].

In Step S303, the control unit determines the initial size of the content management file on the basis of the size [Fsize] of the free space on the recording medium. The determination of the initial size of the content management file on the basis of the size [Fsize] of the free space on the recording medium will be described in detail below with reference to FIG. 8. In Step S304, the control unit creates the content management file having the initial size determined in Step S303 and records the content management file on the recording medium. The dummy data is embedded in at least part of the content management file to be recorded on the recording medium.

Figure 8:
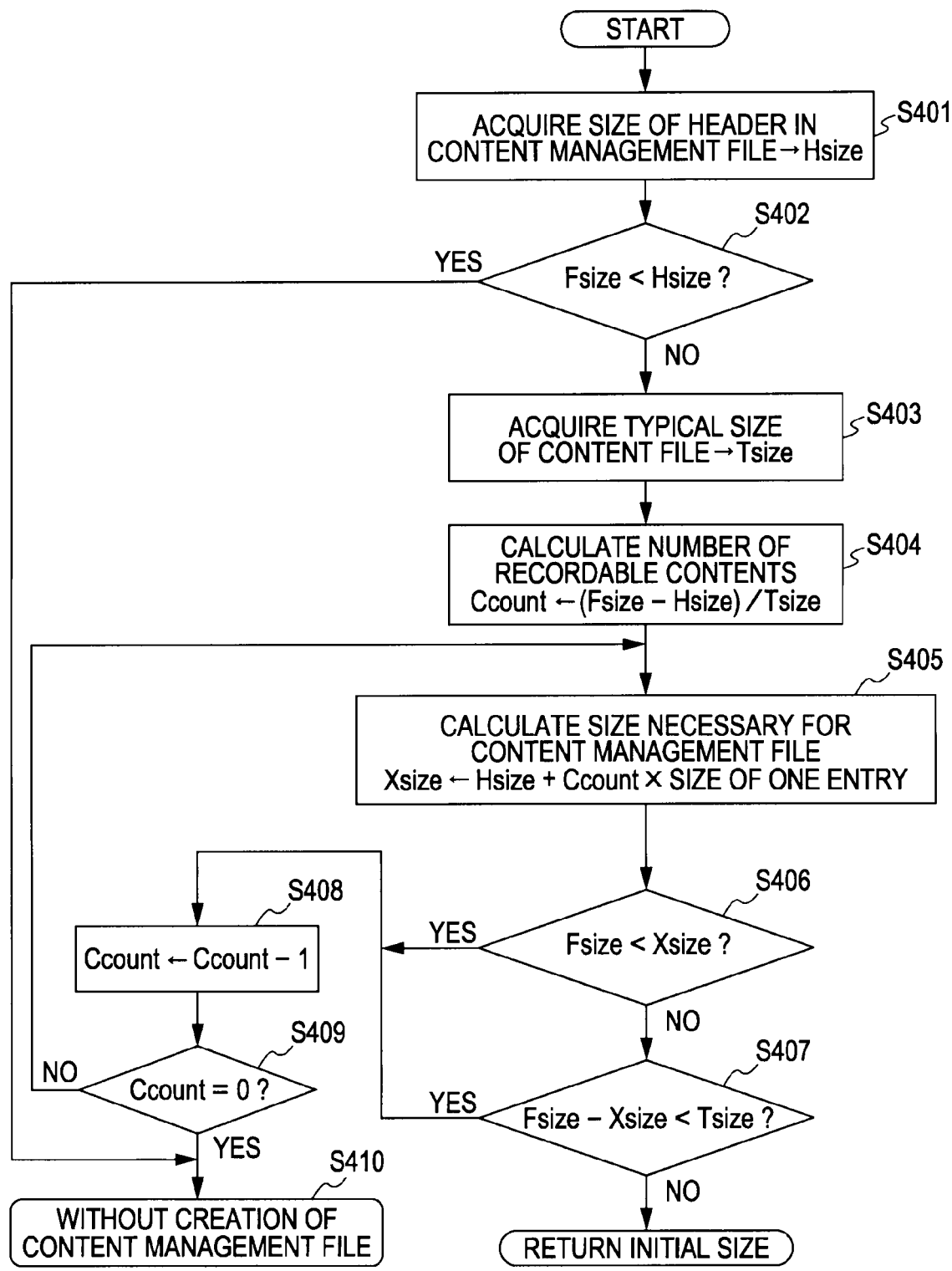
FIG. 8 is a flowchart showing in detail another example of the process of determining the size of the content management file, performed in the information recording apparatus according to the embodiment of the present invention.

FIG. 8 is a flowchart showing in detail an example of the process of determining the initial size of the content management file on the basis of the size [Fsize] of the free space on the recording medium in Step S303. In Step S401, the control unit acquires the size [Hsize] of the header in the content management file. The size [Hsize] of the header in the content management file indicates the size of the header in the property file shown in FIG. 2 and has a predetermined fixed value. The size [Hsize] of the header in the content management file is acquired from, for example, the data recorded in the memory.

In Step S402, the control unit compares the size [Fsize] of the free space on the recording medium with the size [Hsize] of the header in the content management file to determine whether the size [Hsize] of the header in the content management file is larger than the size [Fsize] of the free space on the recording medium, that is, whether Fsize<Hsize. If Fsize<Hsize, it is not possible to newly record the content management file in the area corresponding to the size [Fsize] of the free space on the recording medium. In this case, the process goes to Step S410 and terminates without creating the content management file.

If the control unit determines in Step S402 that Fsize≧Hsize, then in Step S403, the control unit acquires the typical size of the content management file from the memory. The typical size is denoted by [Tsize].

As described above, the typical size [Tsize] indicates the typical size of one content file. For example, in the case of a still camera capturing still images, the typical size [Tsize] indicates the typical size of one content file in which one still image is stored. In the case of a video camera, the typical size [Tsize] indicates the typical size of one content file in which one video content is stored. Such a typical size is set in advance and is recorded in the memory of the information recording apparatus.

The typical size of one content file is determined in accordance with the kind of the contents recorded in the information recording apparatus, as described above.

(a) When still images are recorded as contents in the information recording apparatus, the typical size is set to (a1) the file size of data in the highest image quality at the highest resolution at which the still images can be recorded, or (a2) the file size of data in the standard image quality at the highest resolution at which the still images can be recorded.

(b) When moving images are recorded as contents in the information recording apparatus, the typical size is set to (b1) the file size of data captured in the highest image quality for the recording time statically calculated for one content, or (b2) the file size of data captured in the highest image quality for the shortest time during which one content can be recorded.

(c) When both still images and moving images are recorded as contents in the information recording apparatus, the typical file sizes (the average file sizes) of the still images and the moving images are calculated, and the frequencies at which the still images and the moving images are captured are statically calculated. The file size calculated by weighted average is determined to be the typical size.

As described above, the typical size is determined in advance depending on the kind of contents recorded in the information recording apparatus and the determined typical file size is stored in the memory as registration information. An algorithm for calculating the typical file size may be set in a program and the algorithm may be sequentially executed to determine the typical size.

Referring back to FIG. 8, in Step S404, the control unit calculates the number [Ccount] of contents recordable on the recording medium. The number [Ccount] of contents recordable on the recording medium is calculated according to the following equation:

$$[Ccount]=[Fsize-Hsize]/Tsize$$

where "Fsize" denotes the size of the free space on the recording medium, "Hsize" denotes the size of the header in the content management file (the size of the header in the property file in FIG. 2 and a fixed value), and "Tsize" denotes the typical size of the content file.

In Step S405, the control unit calculates the size [Xsize] necessary for the content management file. The size [Xsize] necessary for the content management file is calculated according to the following equation:

$$Xsize=Hsize+Ccount\times(\text{size of one entry})$$

where "Hsize" denotes the size of the header in the content management file (the size of the header in the property file in FIG. 2 and a fixed value), "Ccount" denotes the number of contents recordable on the recording medium, and the "size of one entry" denotes the size of the entry set for one content file set in the content management file (the total of the sizes of one entry in the property file, one entry in the thumbnail file, and one entry in the metadata file shown in FIG. 2 and a predetermined fixed value).

The size of the content management file is calculated in units of clusters or in units of sectors in the file system of the recording medium. In other words, the size of the content management file is calculated in units of recording or reading of data.

In Step S406, the control unit determines whether the content management file having the calculated size can be recorded in the free space on the recording medium. Specifically, the control unit compares the size [Xsize] of the content management file calculated in Step S405 with the size [Fsize] of the free space on the recording medium calculated in Step S302 in FIG. 7.

If Fsize<Xsize, the control unit determines that it is not possible to record the content management file in the free space on the recording medium because the size [Xsize] of the content management file calculated in Step S405 is larger than the size [Fsize] of the free space on the recording medium. In this case, the process goes to Step S408 and the control unit adjusts the size [Xsize] of the content management file again. If Fsize≧Xsize, the control unit determines that it is possible to record the content management file in the free space on the recording medium because the size [Xsize] of the content management file calculated in Step S405 is smaller than or equal to the size [Fsize] of the free space on the recording medium. In this case, the process goes to Step S407.

In Step S407, the control unit determines whether the size given by subtracting the size [Xsize] of the content management file from the size [Fsize] of the free space on the recording medium is smaller than the typical size [Tsize] of the content file. That is, the control unit determines whether Fsize−Xsize<Tsize.

If Fsize−Xsize<Tsize, recording of the content management file in the free space on the recording medium leaves no area where the content file can be written. In this case, the process goes to Step S408 and the control unit adjusts the size [Xsize] of the content management file again. If Fsize−Xsize≧Tsize, recording of the content management file in the free space on the recording medium leaves any area where the content file can be written. In this case, the control unit determines the size [Xsize] of the content management file determined in Step S405 to be the final size of the content management file.

If the control unit determines in Step S406 that Fsize <Xsize or determines in Step S407 that Fsize−Xsize<Tsize, the process goes to Step S408 and the control unit adjusts the size [Xsize] of the content management file again.

Specifically, in Step S408, the control unit decrements the number [Ccount] of contents recordable on the recording medium calculated in Step S404 by one to update the number [Ccount] of contents recordable on the recording medium.

Next, in Step S409, the control unit determines whether the updated number [Ccount] of contents recordable on the recording medium is equal to zero.

If the control unit determines that the updated number [Ccount] of contents recordable on the recording medium is equal to zero, recording of the content management file makes the number of content files recordable on the recording medium zero and it makes no sense to record the content management file. In this case, the process goes to Step S410 and terminates without creating the content management file.

If the control unit determines in Step S409 that the updated number [Ccount] of contents recordable on the recording medium is not equal to zero, recording of the content management file leaves any content file recordable on the recording medium and it makes sense to record the content management file. In this case, the process goes back to Step S405 and the control unit calculates the size [Xsize] of the content management file according to the following equation by using the updated number [Ccount] of contents recordable on the recording medium:

$$Xsize=Hsize+Ccount\times(size\ of\ one\ entry)$$

Then, the control unit determines in Step S406 whether Fsize<Xsize and determines in Step S407 whether Fsize−Xsize<Tsize. If the control unit determines in Step S406 that the size [Xsize] of the content management file is smaller than or equal to the size [Fsize] of the free space on the recording medium and determines in Step S407 that the size given by subtracting the size [Xsize] of the content management file from the size [Fsize] of the free space on the recording medium is larger than or equal to the typical size [Tsize] of the content file, the control unit determines the size [Xsize] of the content management file to be the final size of the content management file.

The process shown in FIG. 8 corresponds to Step S303 in FIG. 7 in which the initial size of the content management file is determined on the basis of the size [Fsize] of the free space on the recording medium. Then, in Step S304, the control unit creates the content management file having the initial size determined in Step S303 and records the content management file on the recording medium. The dummy data is embedded in at least part of the content management file to be recorded on the recording medium.

The calculation of the size [Xsize] of the content management file in the above manner can create the content management file in which the entries of the number appropriate for the number of content files recordable on the recording medium are set to record the content management file on the recording medium.

Figure 9:
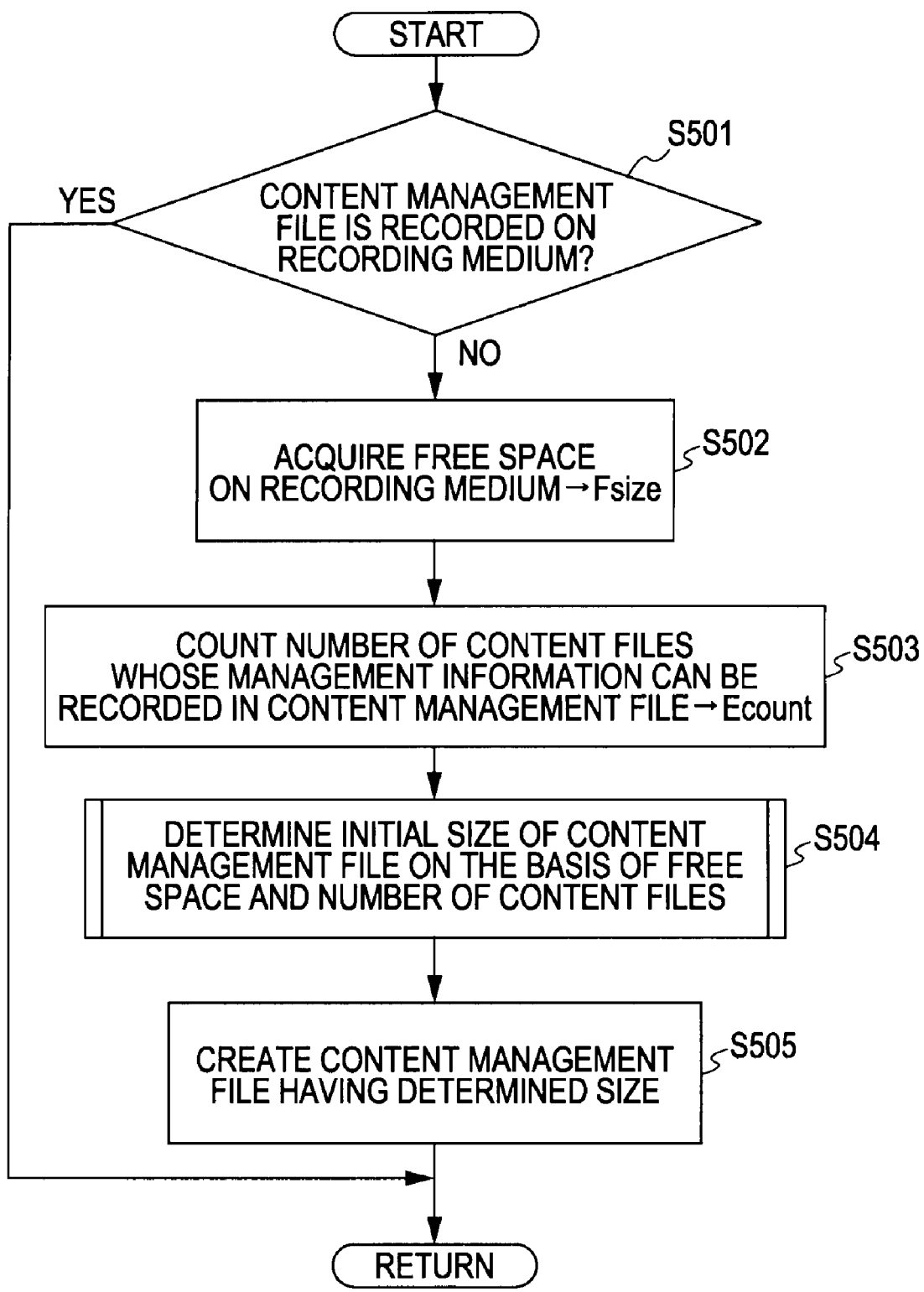
FIG. 9 is a flowchart showing another example of the process of determining the size of the content management file to create the content management file, performed in the information recording apparatus according to the embodiment of the present invention.

3. Setup of the Content Management File on the Recording Medium on which the Content Files are Recorded FIG. 9 is a flowchart showing an example of a process of checking the recording medium on which the content files have already been recorded to determine the appropriate size of the content management file and to record the content management file having the determined size on the recording medium.

In Step S501, the control unit determines whether the content management file is recorded on the recording medium loaded in the information recording apparatus. If the control unit determines that the content management file is recorded on the recording medium, the process terminates because there is no need to newly record the content management file on the recording medium. If the control unit determines that the content management file is not recorded on the recording medium, the process goes to Step S502.

In Step S502, the control unit acquires the free space on the recording medium loaded in the information recording apparatus. In this case, the control unit acquires the size of the area where no data is recorded on the recording medium, excluding the area where the data has been recorded. The acquired size of the free space on the recording medium is denoted by [Fsize].

In Step S503, the control unit checks the content files recorded on the recording medium to count the number of content files whose management information can be recorded in the content management file to be newly recorded. In this case, for example, the control unit determines whether image files are stored in the content files based on the file identifiers (for example, "jpeg"). If the control unit determines that the images files are stored in the content files, the control unit determines that the management information of the content files can be recorded in the content management file and counts the number of content files. The number of content files which are recorded on the recording medium and whose management information can be recorded in the content management file is denoted by [Ecount].

In Step S504, the control unit determines the initial size of the content management file on the basis of the size [Fsize] of the free space on the recording medium. The determination in Step S504 will be described in detail below with reference to FIG. 10. In Step S505, the control unit creates the content management file having the initial size determined in Step S504 and records the content management file on the recording medium. The dummy data is embedded in at least part of the content management file to be recorded on the recording medium.

Figure 10:
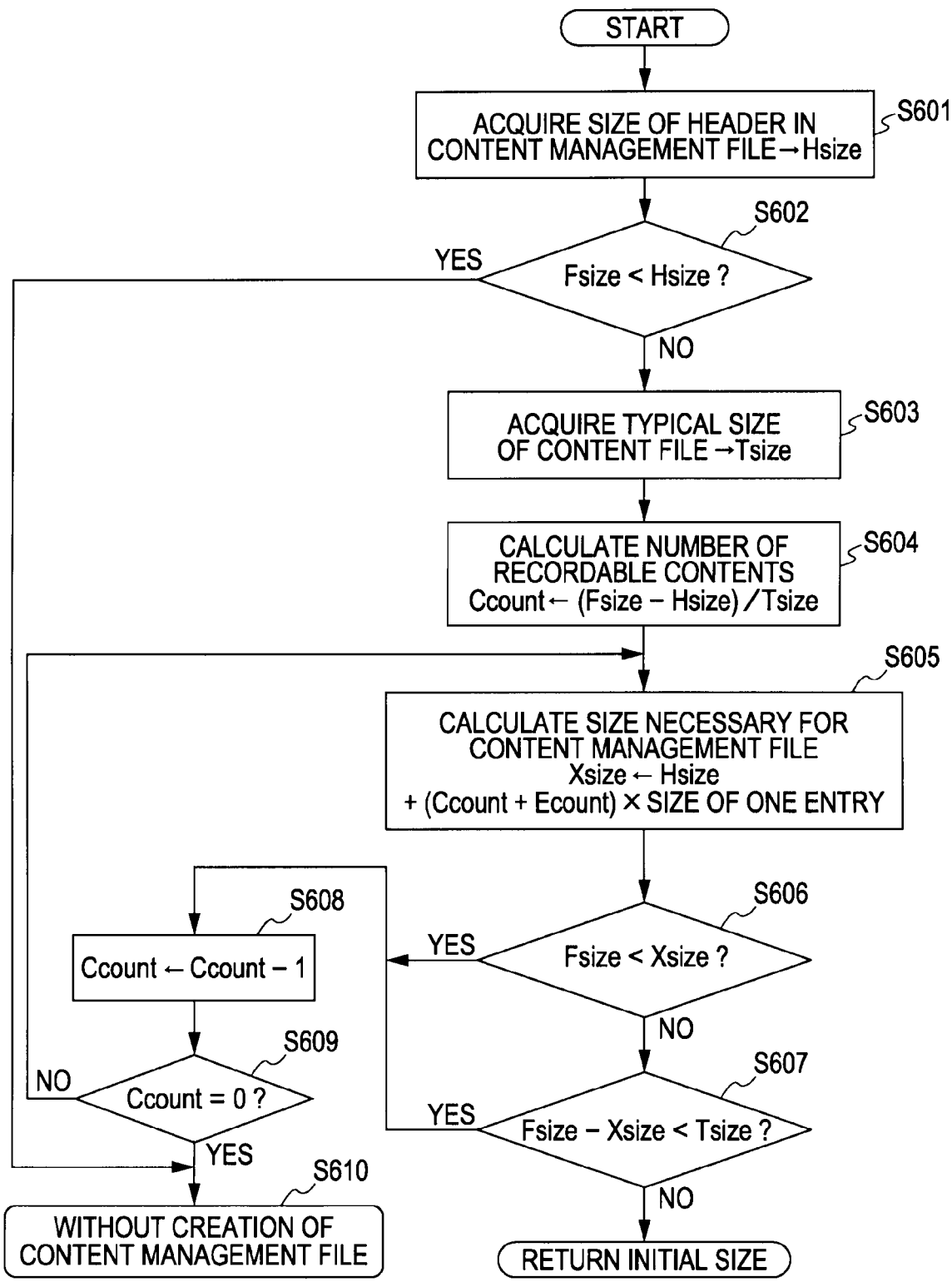
FIG. 10 is a flowchart showing in detail another example of the process of determining the size of the content management file, performed in the information recording apparatus according to the embodiment of the present invention.

FIG. 10 is a flowchart showing in detail an example of the process of determining the initial size of the content management file on the basis of the size [Fsize] of the free space on the recording medium in Step S504.

The flowchart shown in FIG. 10 is similar to the one shown in FIG. 8. The flowchart shown in FIG. 10 differs from the one shown in FIG. 8 in Step S605 in which the size [Xsize] necessary for the content management file is calculated.

The size [Xsize] of the content management file is calculated according to the following equation in the process shown in FIG. 10:

$$Xsize = Hsize + (Ccount + Ecount) \times (\text{size of one entry})$$

where "Hsize" denotes the size of the header in the content management file (the size of the header in the property file in FIG. 2 and a fixed value), "Ccount" denotes the number of contents recordable on the recording medium, "Ecount" denotes the number of content files which are recorded on the recording medium and whose management information can be recorded in the content management file, and the "size of one entry" denotes the size of the entry set for one content file set in the content management file (the total of the sizes of one entry in the property file, one entry in the thumbnail file, and one entry in the metadata file shown in FIG. 2 and a predetermined fixed value).

In the process shown in FIG. 10, the size [Xsize] of the content management file is calculated in consideration of the number [Ecount] of content files which are recorded on the recording medium and whose management information can be recorded in the content management file.

In other words, the management information corresponding to the content files recorded on the recording medium is recorded in the content management file to be newly created. In addition, it is necessary to allocate the area where the management information corresponding to the number [Ccount] of contents to be newly recorded is recorded in the content management file to be newly created. The size [Xsize] of the content management file is calculated in consideration of the total of (a) the number [Ecount] of content files that have been recorded on the recording medium and (b) the number [Ccount] of content files to be recorded on the recording medium.

Since the steps other than Step S605 in the process in FIG. 10 are the same as in the process in FIG. 8, a description of such steps is omitted herein.

The process shown in FIG. 10 corresponds to step S504 in FIG. 9 in which the initial size of the content management file is determined on the basis of the size [Fsize] of the free space on the recording medium. Then, in Step S505, the control unit creates the content management file having the initial size determined in Step S504 and records the content management file on the recording medium. In the content management file to be recorded on the recording medium, some entry areas have the management information corresponding to the recorded content files recorded therein and the remaining entry areas have the dummy data embedded therein.

The calculation of the size [Xsize] of the content management file in the above manner can create the content management file in which the entries of the number appropriate for the free space on the recording medium, the number of the recorded content files, and the number of content files recordable on the recording medium are set to record the content management file on the recording medium.

4. Increase in the Size of the Content Management File

Figure 11:
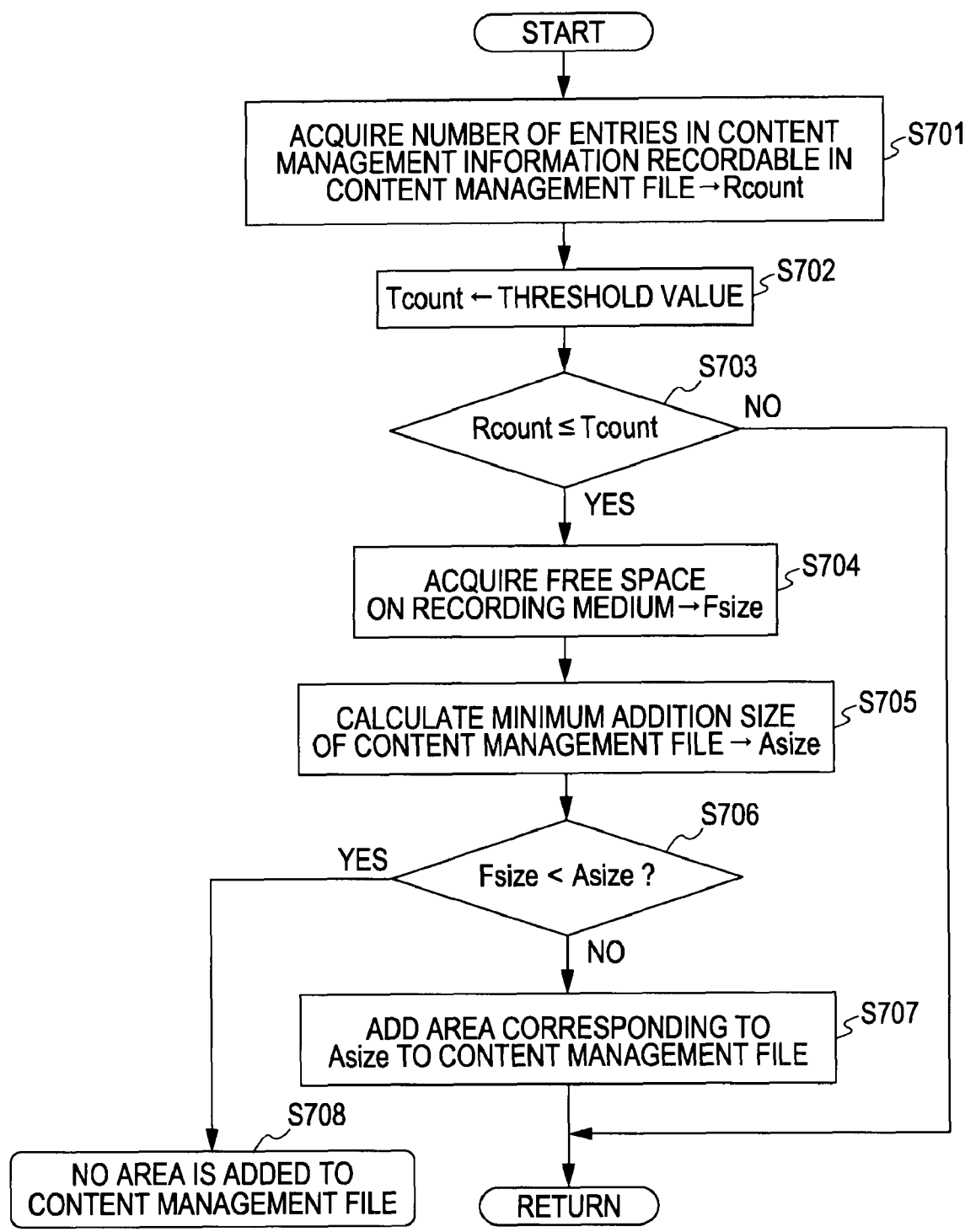
FIG. 11 is a flowchart showing an example of a process of increasing the size of the content management file, performed in the information recording apparatus according to the embodiment of the present invention.

FIG. 11 is a flowchart showing an example of a process of varying the size of the content management file on the recording medium on which the content management file has already been recorded to record the management information corresponding to the content files to be newly recorded on the recording medium.

In Step S701, the control unit checks the content files recorded on the recording medium to acquire the number of entries in the content management information recordable in the content management file, that is, to acquire the number of free entries. The content files of the number corresponding to the number of free entries can be newly recorded on the recording medium. The number of content files newly recordable on the recording medium, corresponding to the number of free entries, is denoted by [Rcount].

In Step S702, the control unit sets a threshold value [Tcount]. The threshold value [Tcount] is a predetermined value and is used in determination of whether the size of the content management file is varied in Step S704 and the subsequent steps. For example, if the number of free entries in the content management file (the number of content files that can be newly recorded) is equal to one and the size of the content management file is to be varied in Step S704 and the subsequent steps, the threshold value [Tcount] is set to one. If the number of free entries in the content management file (the number of content files that can be newly recorded) is equal to five and the size of the content management file is to be varied in Step S704 and the subsequent steps, the threshold value [Tcount] is set to five. The threshold value [Tcount] is set in advance and is recorded in the memory.

For example, the threshold value [Tcount] is set to one to record a moving image content, and the threshold value [Tcount] is set to one or a value equal to the number of contents that can continuously captured to record a still image content.

In Step S703, the control unit compares the threshold value [Tcount] with the number [Rcount] of content files newly recordable on the recording medium, corresponding to the number of free entries, acquired in Step S701. If Rcount≦Tcount, the size of the content management file is to be varied in Step S704 and the subsequent steps. If Rcount>Tcount, the process terminates without varying the size of the content management file in Step S704 and the subsequent steps because the number [Rcount] of content files newly recordable on the recording medium, corresponding to the number of free entries in the content management file, is larger than the threshold value [Tcount] and the recording medium can additionally accommodate the content files.

If the control unit determines in Step S703 that Rcount≦Tcount, the size of the content management file is to be varied in Step S704 and the subsequent steps. In Step S704, the control unit acquires the size [Fsize] of the free space on the recording medium.

In Step S705, the control unit calculates a minimum addition size [Asize] of the content management file. The minimum addition size [Asize] of the content management file is a predetermined size and corresponds to, for example, the size of n-number entry areas in which the n-number pieces of content management information are recorded. Specifically, if the area where the management information corresponding to ten content files is recorded is to be added in one variation of the size of the content management file, the size of ten-unit entry areas is set as the minimum addition size [Asize] of the content management file. The entry areas necessary for one content file include one entry in the property file, one entry in the thumbnail file, and one entry in the metadata file shown in FIG. 2. The total area of such entries corresponds to one-unit entry area corresponding to one content file.

The minimum addition size [Asize] of the content management file is set in units of clusters or in units of sectors in the file system of the recording medium. For example, the minimum addition size [Asize] is set in one to several clusters or in one to several sectors. In other words, the minimum addition size [Asize] is set in units of recording or playback of data. In addition, the minimum addition size [Asize] of the content management file is preferably set to a value that is not too high and that does not frequently cause the increase in the size, in consideration of the size of one entry corresponding to one content file and the size of the cluster or sector.

In Step S706, the control unit compares the size [Fsize] of the free space on the recording medium with the minimum addition size [Asize] of the content management file. If Fsize<Asize, that is, if the size [Fsize] of the free space on the recording medium is smaller than the minimum addition size [Asize] of the content management file, the control unit determines that it is not possible to increase the size of the content management file. In this case, the process goes to Step S708 and terminates.

If Fsize≧Asize, that is, if the size [Fsize] of the free space on the recording medium is larger than or equal to the minimum addition size [Asize] of the content management file, the control unit determines that it is possible to increase the size of the content management file. In this case, the process goes to Step S707 and the control unit adds the minimum addition size [Asize] of the content management file to the current size of the content management file to update the size of the content management file. The dummy data is embedded in the added area.

The content management file having a new size depending on the size [Fsize] of the free space on the recording medium can be set and recorded on the recording medium in the above manner. The above process is effective when a variety of data recorded on the recording medium is deleted to increase the size [Fsize] of the free space on the recording medium.

5. Increase in the Size of the Content Management File in Consideration of the Free Space on the Recording Medium In the process shown in FIG. 11, the size of the content management file is varied on the recording medium on which the content management file has already been recorded to record the management information corresponding to the content files to be newly recorded. However, the area where the content files are to be newly recorded is not considered in the process shown in FIG. 11. A process of allocating the area where the content files are to be newly recorded in consideration of the free space on the recording medium to increase the size of the content management file will now be described with reference to FIG. 12.

Figure 12:
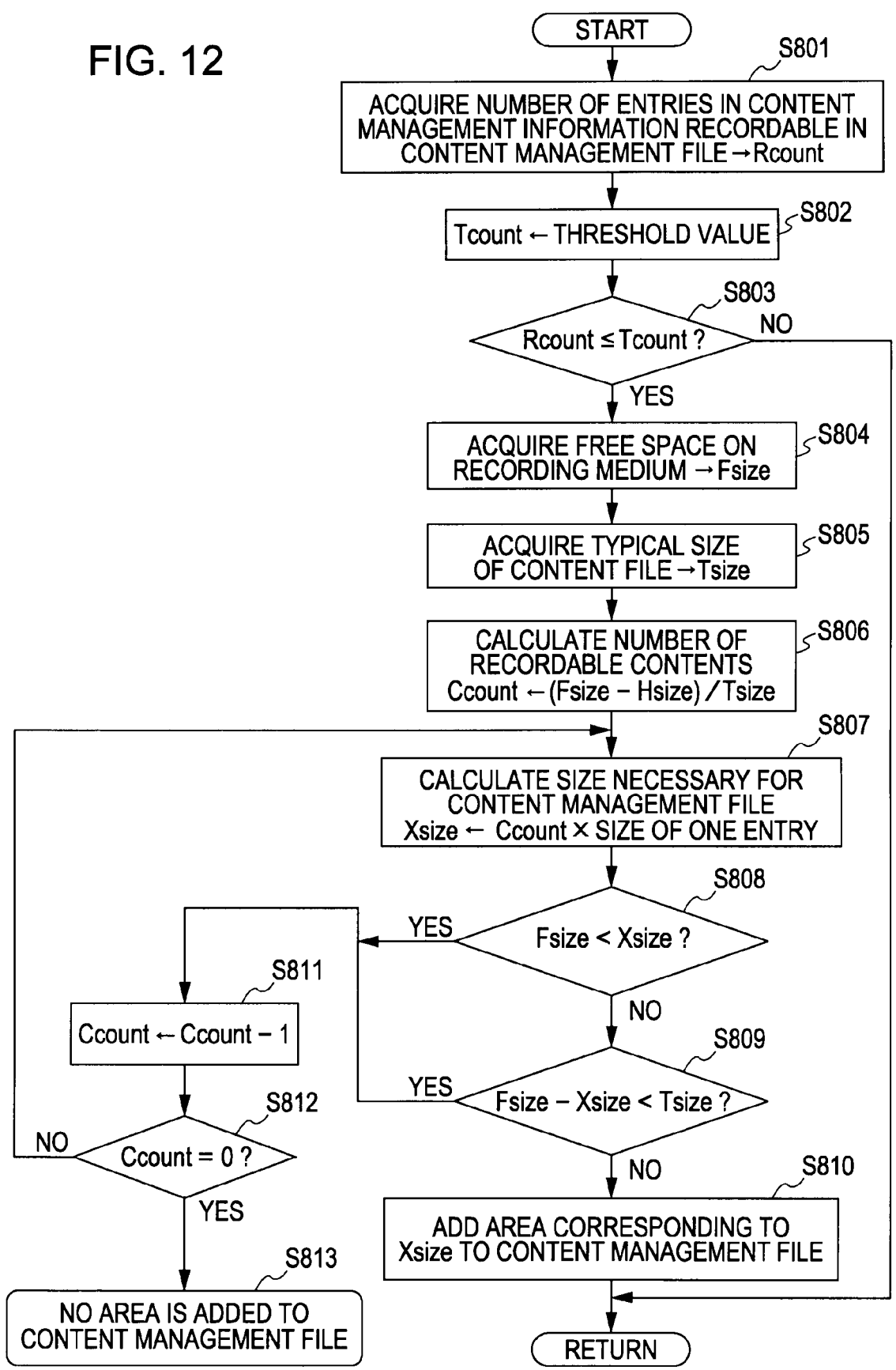
FIG. 12 is a flowchart showing another example of the process of increasing the size of the content management file, performed in the information recording apparatus according to the embodiment of the present invention.

Referring to FIG. 12, in Step S801, the control unit checks the content files recorded on the recording medium to acquire the number of entries in the content management information recordable in the content management file, that is, to acquire the number of free entries. The content files of the number corresponding to the number of free entries can be newly recorded on the recording medium. The number of content files newly recordable on the recording medium, corresponding to the number of free entries, is denoted by [Rcount].

In Step S802, the control unit sets a threshold value [Tcount]. The threshold value [Tcount] is a predetermined value and is used in determination of whether the size of the content management file is varied in Step S804 and the subsequent steps. As described above, for example, if the number of free entries in the content management file (the number of content files that can be newly recorded) is equal to one and the size of the content management file is to be varied in Step S804 and the subsequent steps, the threshold value [Tcount] is set to one. If the number of free entries in the content management file (the number of content files that can be newly recorded) is equal to five and the size of the content management file is to be varied in Step S804 and the subsequent steps, the threshold value [Tcount] is set to five. The threshold value [Tcount] is set in advance and is recorded in the memory.

In Step S803, the control unit compares the threshold value [Tcount] with the number [Rcount] of content files newly recordable on the recording medium, corresponding to the number of free entries, acquired in Step S801. If Rcount≦Tcount, the size of the content management file is to be varied in Step S804 and the subsequent steps. If Rcount>Tcount, the process terminates without varying the size of the content management file in Step S804 and the subsequent steps because the number [Rcount] of content files newly recordable on the recording medium, corresponding to the number of free entries in the content management file, is larger than the threshold value [Tcount] and the recording medium can additionally accommodate the content files.

If the control unit determines in Step S803 that Rcount ≦Tcount, the size of the content management file is to be varied in Step S804 and the subsequent steps. In Step S804, the control unit acquires the size [Fsize] of the free space on the recording medium.

In Step S805, the control unit acquires the typical size [Tsize] of the content file. The typical size [Tsize] indicates the typical size of one content file. For example, in the case of a still camera capturing still images, the typical size [Tsize] indicates the typical size of one content file in which one still image is stored. In the case of a video camera, the typical size [Tsize] indicates the typical size of one content file in which one video content is stored. Such a typical size is set in advance and is recorded in the memory of the information recording apparatus.

In Step S806, the control unit calculates the number [Ccount] of contents recordable on the recording medium. The number [Ccount] of contents recordable on the recording medium is calculated according to the following equation:

$$[C\text{count}]=[F\text{size}-H\text{size}]/T\text{size}$$

where "Fsize" denotes the size [Fsize] of the free space on the recording medium, "Hsize" denotes the size of the header in the content management file (the size of the header in the property file in FIG. 2 and a fixed value), and "Tsize" denotes the typical size of the content file.

In Step S807, the control unit calculates the additional size [Xsize] necessary to update the content management file. The additional size [Xsize] of the content management file is calculated according to the following equation:

$$X\text{size}=C\text{count}\times(\text{size of one entry})$$

where "Ccount" denotes the number of contents recordable on the recording medium, and the "size of one entry" denotes the size of the entry set for one content file set in the content management file (the total of the sizes of one entry in the property file, one entry in the thumbnail file, and one entry in the metadata file shown in FIG. 2 and a predetermined fixed value).

The size of the content management file is calculated in units of clusters or in units of sectors in the file system of the recording medium. In other words, the size of the content management file is calculated in units of recording or reading of data.

In Step S808, the control unit determines whether the content management file having the calculated size can be recorded in the free space on the recording medium. Specifically, the control unit compares the additional size [Xsize] of the content management file calculated in Step S807 with the size [Fsize] of the free space on the recording medium calculated in Step S804.

If Fsize<Xsize, the control unit determines that it is not possible to record the area corresponding to the additional size [Xsize] of the content management file in the free space on the recording medium because the additional size [Xsize] of the content management file calculated in Step S807 is larger than the size [Fsize] of the free space on the recording medium. In this case, the process goes to Step S811 and the control unit adjusts the additional size [Xsize] of the content management file again. If Fsize≧Xsize, the control unit determines that it is possible to record the area corresponding to the additional size [Xsize] of the content management file in the free space on the recording medium because the additional size [Xsize] of the content management file calculated in Step S807 is smaller than or equal to the size [Fsize] of the free space on the recording medium. In this case, the process goes to Step S809.

In Step S809, the control unit determines whether the size given by subtracting the additional size [Xsize] of the content management file from the size [Fsize] of the free space on the recording medium is smaller than the typical size [Tsize] of the content file. That is, the control unit determines whether Fsize−Xsize<Tsize.

If Fsize−Xsize<Tsize, recording of the area corresponding to the additional size [Xsize] of the content management file in the free space on the recording medium leaves no area where the content file can be written. In this case, the process goes to Step S811 and the control unit adjusts the additional size [Xsize] of the content management file again. If Fsize−Xsize≧Tsize, recording of the area corresponding to the additional size [Xsize] of the content management file in the free space on the recording medium leaves any area where the content file can be written. In this case, the process goes to Step S810 and the control unit adds the area corresponding to the additional size [Xsize] of the content management file calculated in Step S807 to the content management file.

If the control unit determines in Step S808 that Fsize <Xsize or determines in Step S809 that Fsize−Xsize<Tsize, the process goes to Step S811 and the control unit adjusts the additional size [Xsize] of the content management file again.

Specifically, in Step S811, the control unit decrements the number [Ccount] of contents recordable on the recording medium calculated in Step S806 by one to update the number [Ccount] of contents recordable on the recording medium.

Next, in Step S812, the control unit determines whether the updated number [Ccount] of contents recordable on the recording medium is equal to zero.

If the control unit determines that the updated number [Ccount] of contents recordable on the recording medium is equal to zero, increasing the size of the content management file makes the number of content files recordable on the recording medium zero and it makes no sense to increase the size of the content management file. In this case, the process goes to Step S813 and terminates without increasing the size of the content management file.

If the control unit determines in Step S812 that the updated number [Ccount] of contents recordable on the recording medium is not equal to zero, increasing the size of the content management file leaves any content file recordable on the recording medium and it makes sense to increase the size of the content management file. In this case, the process goes back to Step S807 and the control unit calculates the additional size [Xsize] of the content management file according to the following equation by using the updated number [Ccount] of contents recordable on the recording medium:

$$Xsize = Ccount \times (\text{size of one entry})$$

Then, the control unit determines in Step S808 whether Fsize<Xsize and determines in Step S809 whether Fsize−Xsize<Tsize. If the control unit determines in Step S808 that the additional size [Xsize] of the content management file is smaller than or equal to the size [Fsize] of the free space on the recording medium and determines in Step S809 that the size given by subtracting the additional size [Xsize] of the content management file from the size [Fsize] of the free space on the recording medium is larger than or equal to the typical size [Tsize] of the content file, the control unit determines the additional size [Xsize] of the content management file to be the final additional size [Xsize] of the content management file. In Step S810, the control unit adds the area corresponding to the determined additional size [Xsize] of the content management file to the content management file.

The content management file having a new size depending on the size [Fsize] of the free space on the recording medium can be set and recorded on the recording medium in the above manner. In the process in FIG. 12, a content file can be newly recorded in the free space on the recording medium. The process in FIG. 12 is effective when a variety of data recorded on the recording medium is deleted to increase the size [Fsize] of the free space on the recording medium, as in the process shown in FIG. 11.

It should be understood by those skilled in the art that various modifications, combinations, sub-combinations and alterations may occur depending on design requirements and other factors insofar as they are within the scope of the appended claims or the equivalents thereof.

The series of the processes according to the embodiments of the present invention can be executed by hardware, software, or combination of hardware and software. If the processes are executed by software, the programs in which the processes are recorded may be installed in a memory in the computer incorporated in dedicated hardware to be executed. Alternatively, the programs may be installed in a general-purpose computer capable of executing a variety of processing to be executed.

For example, the programs may be recorded in advance on a recording medium and may be installed in a computer from the recording medium. Alternatively, the programs may be downloaded over a network, such as a local area network (LAN) or the Internet, and may be installed in a recording medium, such as a hard disk, incorporated in the computer.

The various processes according to the embodiments of the present invention may be performed in time series in the described order or may be performed in parallel or individually depending on the performance of the apparatus performing the processes or if needed.

What is claimed is:

1. An information recording apparatus for recording contents on a recording medium and managing the contents by using a content management file, the information recording apparatus comprising:

a control unit that checks a recording state of the recording medium loaded in the information recording apparatus to determine a size of the content management file to be recorded on the recording medium;

a content management file creating unit that creates the content management file having the size determined by the control unit; and recording means for recording the created content management file on the recording medium, wherein the control unit determines the size of the content management file on the basis of the recording capacity of a first area where the contents are to be recorded on the recording medium, the first area being separate from a second area where the content management file is to be recorded, and a predetermined average size of the contents to be recorded on the recording medium, and wherein the recording means records the content management file in accordance with the determined size on the recording medium.

2. The information recording apparatus according to claim 1, wherein the recording state at least includes the presence of the content management file and the recording capacity of the recording medium, and the content management file creating unit creates the content management file when the content management file is not stored in the recording medium.

3. The information recording apparatus according to claim 1, wherein the control unit determines the size of the content management file on the basis of the recording capacity of the recording medium.

4. An information recording apparatus for recording contents on a recording medium and managing the contents by using a content management file, the information recording apparatus comprising:

updating means for updating the content management file recorded on the recording medium; and a control unit that checks a recording state of the recording medium loaded in the information recording apparatus to determine a size of the updated content management file to be recorded on the recording medium, wherein the control unit determines the size of the updated content management file on the basis of the recording capacity of a first area where the contents are to be recorded on the recording medium, the first area being separate from a second area where the content management file is recorded, the size of the content management file, and a predetermined average size of the contents to be recorded on the recording medium, and wherein the updating means updates the content management file recorded on the recording medium in accordance with the determined size of the updated content management file.

5. The information recording apparatus according to claim 4, wherein the recording state at least includes the presence of the content management file and the recording capacity of the recording medium.

6. An information recording method for recording contents on a recording medium loaded in an information recording apparatus and managing the contents by using a content management file, the method comprising:

checking, at the information recording apparatus, a recording state of the recording medium loaded in the information recording apparatus;

determining a size of the content management file on the basis of the recording capacity of a first area where the contents are to be recorded on the recording medium, the first area being separate from a second area where the content management file is to be recorded, and a predetermined average size of the contents to be recorded on the recording medium;

creating the content management file having the determined size; and recording the created content management file in accordance with the determined size on the recording medium.

7. The information recording method according to claim 6, wherein the determining step comprises determining the size of the content management file in accordance with the recording capacity of the recording medium.

8. An information recording apparatus for recording contents on a recording medium and managing the contents by using a content management file, the information recording apparatus comprising:

a control unit that checks a recording state of the recording medium loaded in the information recording apparatus to determine a size of the content management file to be recorded on the recording medium;

a content management file creating unit that creates the content management file having the size determined by the control unit; and a recording unit that records the created content management file on the recording medium, wherein the control unit determines the size of the content management file on the basis of the recording capacity of a first area where the contents are to be recorded on the recording medium, the first area being separate from a second area where the content management file is to be recorded, and a predetermined average size of the contents to be recorded on the recording medium, and wherein the recording unit records the content management file in accordance with the determined size on the recording medium.

9. An information recording apparatus for recording contents on a recording medium and managing the contents by using a content management file, the information recording apparatus comprising:

an updating unit that updates the content management file recorded on the recording medium; and a control unit that checks a recording state of the recording medium loaded in the information recording apparatus to determine a size of the updated content management file to be recorded on the recording medium, wherein the control unit determines the size of the updated content management file on the basis of the recording capacity of a first area where the contents are to be recorded on the recording medium, the first area being separate from a second area where the content management file is recorded, the size of the content management file, and a predetermined average size of the contents to be recorded on the recording medium, and wherein the updating unit updates the content management file recorded on the recording medium in accordance with the determined size of the updated content management file.

* * * * *